(12) United States Patent
Donahue

(10) Patent No.: US 7,987,494 B1
(45) Date of Patent: Jul. 26, 2011

(54) METHOD AND APPARATUS PROVIDING END TO END PROTECTION FOR A DOCUMENT

(75) Inventor: James Donahue, Sunnyvale, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1616 days.

(21) Appl. No.: 11/311,956

(22) Filed: Dec. 19, 2005

(51) Int. Cl.
| | |
|---|---|
| G06F 7/04 | (2006.01) |
| G06F 17/30 | (2006.01) |
| G06F 21/00 | (2006.01) |
| H04N 7/16 | (2006.01) |
| H04N 1/44 | (2006.01) |
| H04L 9/32 | (2006.01) |
| G09C 3/08 | (2006.01) |
| G09C 3/00 | (2006.01) |
| B41K 3/38 | (2006.01) |
| B42D 15/00 | (2006.01) |
| G03G 21/00 | (2006.01) |
| H03K 19/00 | (2006.01) |

(52) U.S. Cl. .............. 726/1; 726/2; 726/27; 726/31; 726/32; 726/33; 713/176; 380/51; 380/59; 380/243; 283/73; 283/74; 283/94; 283/113; 283/114; 399/366; 326/8; 705/57

(58) Field of Classification Search .............. 726/1, 2, 726/16, 17, 21, 26, 27–33; 380/59; 399/366; 326/8; 705/51, 54, 57, 59, 62
See application file for complete search history.

(56) References Cited

U.S. PATENT DOCUMENTS

| | | | |
|---|---|---|---|
| 6,289,450 B1* | 9/2001 | Pensak et al. ................. 713/167 |
| 7,260,555 B2* | 8/2007 | Rossmann et al. .............. 705/51 |
| 7,380,120 B1* | 5/2008 | Garcia .......................... 713/160 |
| 7,506,365 B2* | 3/2009 | Hirano et al. ...................... 726/5 |
| 2001/0023421 A1* | 9/2001 | Numao et al. .................... 707/9 |
| 2002/0078361 A1* | 6/2002 | Giroux et al. ................. 713/183 |
| 2003/0105950 A1* | 6/2003 | Hirano et al. ................. 713/100 |
| 2003/0110131 A1* | 6/2003 | Alain et al. ..................... 705/51 |
| 2003/0196108 A1* | 10/2003 | Kung ............................ 713/200 |
| 2004/0125402 A1* | 7/2004 | Kanai et al. ................. 358/1.15 |
| 2004/0128555 A1* | 7/2004 | Saitoh et al. .................. 713/201 |
| 2005/0021980 A1* | 1/2005 | Kanai .......................... 713/182 |
| 2005/0168766 A1* | 8/2005 | Troyansky et al. .......... 358/1.14 |
| 2005/0171914 A1* | 8/2005 | Saitoh ............................. 705/51 |
| 2005/0192830 A1* | 9/2005 | Pugh et al. ....................... 705/1 |
| 2006/0075463 A1* | 4/2006 | Braddy et al. ................... 726/1 |
| 2006/0236366 A1* | 10/2006 | Walczyk ........................... 726/1 |

* cited by examiner

Primary Examiner — Nasser Moazzami
Assistant Examiner — Oscar A Louie
(74) Attorney, Agent, or Firm — Kilpatrick Townsend & Stockton LLP

(57) ABSTRACT

A method, apparatus and computer program product for providing protection for a document is presented. Document content of the document is obtained. An occurrence of a security code within the document content is detected, the security code associated with the document content. A security policy associated with the security code is identified. The identified security policy is then applied to the document content.

17 Claims, 3 Drawing Sheets

10⟶ supplier diversity policy requires that small, minority, women or disabled veteran enterprises should have the maximum practicable opportunity to participate in providing Services and Deliverables to XX. At XX's request, Supplier will provide information to XX concerning Supplier's status as a small, minority, women or disabled veteran enterprise or Supplier's use of such enterprises as subcontractors, and, concurrent with the execution of this Agreement, Supplier will complete XX's Supplier Certification Form. ⟵12
XX may terminate this Agreement and any Contract Order if Supplier fails to provide such information or complete XX's Supplier Certification Form.
Construction.
This Agreement will not be construed against either party due to authorship.
Entire Agreement; Modifications; Inconsistencies.
This Agreement, the Schedules and the Contract Orders constitute the entire agreement of the parties as to the Services and Deliverables contained in the Contract Orders and supersede all prior or contemporaneous agreements, proposals, inquiries, commitments, discussions and correspondence, whether written or oral. This Agreement, the Schedules and the Contract Orders may not be amended or modified except in writing signed by a duly authorized representative of each party. If there is an inconsistency between the terms of this Agreement and the terms of any Contract Order, the terms of this Agreement will control, unless otherwise provided in the Contract Order.

SIGNED:

XX MANAGEMENT COMPANY SUPPLIER
(signature)
(print name)
(title)
(date)

⟵14

*Figure 1*

METHOD AND APPARATUS PROVIDING END TO END PROTECTION FOR A DOCUMENT

BACKGROUND

The application of security on documents has always been a delicate balancing act between ease-of-use and adequate protection for the document's contents. When the documents contain commercial content, insufficient security can mean lost income, when the protected content is sensitive confidential information, the consequences can be far more dire. On the other hand, if product documentation were to be password-protected, users may not be able to access it.

As an example, by way of a security policy associated with a document, it's possible to limit printing, the selection (and hence, copying) of text and image, prohibit changing the document or merging with other documents, and to prevent users from filling form fields or digitally signing a document. It is also possible to separately encrypt a document and its attachments. There are additional security measures available: depending on the needs of the document distributor, it's also possible to digitally sign a document to indicate approval and prevent changes from being made to the document, incorporate real-time authentication of a document each time someone attempts to open it and to limit the number of times a document can be opened.

A policy server, for example the Adobe® LiveCycle™ Policy Server (ALPS) available from Adobe Systems Incorporated of San Jose, Calif., allows for the creation, administration, application and authentication of security policies. A security policy is a configurable, re-usable profile that defines security settings that can be applied to a document. Security policies define the usage rights of a document. For example, security policies define who can open, print, edit or fill-out the file. Once a security policy is applied to a document, it becomes a part of the document, meaning that the document will retain its security no matter how many times it is passed on or distributed.

A policy server can be used to create new security policies or apply existing policies, and further can act as a web-based authentication engine. Documents configured to communicate with the Policy Server-enabled server in this way can have their permissions managed dynamically by the document provider.

Before a recipient can access the document, the policy server first authenticates the recipient's identity against credentials stored in the organization's directory. Then, using the appropriate software (e.g. Acrobat® or the Adobe® Reader® software), the user may use the document according to the controls established in the policy. This also means that permission for a given document can be revoked simply by updating the policy on the server. This solves the problem of revoking the security access of ex-employees or those that change their role within an organization. For offline access, it's also possible to set document expiration dates, where users are allowed time-limited or subscription-based access to a given document or set or documents. This forces recipients who desire continued use of protected content to request additional offline access from the document provider once their expiration dates have been reached. This time-limiting feature can also be very useful when it's crucial to have current information, as documents can be set to expire once their content becomes obsolete.

Keeping track of documents is also important, and ALPS also supports an automated document auditing feature. This can be used to track the recipient's use of a protected document, and monitors what happened to the document and when.

Documents can include a code such as a barcode which is a machine-readable representation of information in a visual format on the document. Originally barcodes stored data in the widths and spacings of printed parallel lines, but today they also come in patterns of dots, concentric circles, and hidden in images. Barcodes can be read by optical scanners called barcode readers or scanned from an image by special software. Barcodes are widely used to implement Auto ID Data Capture (AIDC) systems that improve the speed and accuracy of computer data entry.

While traditionally, barcodes encoding schemes represented just numbers, newer symbologies add new characters such as from the upper case alphabet to the complete ASCII character set and beyond. The drive to encode ever more information in combination with the space requirements of simple barcodes led to the development of matrix codes (a type of 2D barcode), which do not consist of bars but rather a grid of square cells. Stacked barcodes are a compromise between true 2D barcodes and linear codes, and are formed by taking a traditional linear symbology and placing it in an envelope that allows multiple rows.

A QR Code is a matrix code (or two-dimensional bar code). Although initially used for tracking parts in vehicle manufacturing, QR Codes are now used for inventory management in a wide variety of industries. More recently, the inclusion of QR Code reading software on camera phones has led to a wide variety of new, consumer-oriented applications, aimed at relieving the user of the tedious task of entering data into their mobile phone. QR Codes storing addresses and URLs are becoming increasingly common in magazines and advertisements. The addition of QR Codes on business cards is also becoming common, greatly simplifying the task of entering the personal details of a new acquaintance into the address book of one's mobile phone.

Another type of code is known as a glyph. A glyph is a particular graphical representation of a grapheme, or sometimes several graphemes in combination, or only a part of a grapheme. A grapheme designates the atomic unit in written language. Graphemes include letters, Chinese ideograms, numerals, punctuation marks, and other symbols. In a phonological orthography a grapheme corresponds to one phoneme. In spelling systems that are non-phonemic—such as the spellings used most widely for written English—multiple graphemes may represent a single phoneme. In computing as well as typography, the term character refers to a grapheme or grapheme-like unit of text, as found in natural language writing systems (scripts). A character or grapheme is a unit of text, whereas a glyph is a graphical unit.

TeX is a typesetting system designed to allow anybody to write high-quality books using a reasonable amount of effort, and to provide a system that would give the exact same results on all computers. TeX is popular in academia, especially in the mathematics, physics and computer science communities. For example, the sequence ffi contains three characters, but will be represented by one glyph in TeX, since the three characters will be combined into a single ligature. Conversely, some typewriters require the use of multiple glyphs to depict a single character (for example, two hyphens in place of a dash, or an overstruck apostrophe and period in place of an exclamation mark).

Most glyphs in typography originate from the carved and cast characters of a typeface, also called a font. In computing, font refers to a typeface manifesting as an indexed collection of glyphs or glyph-rendering instructions, and associated information that facilitates rendering mapping characters to glyphs and for rendering glyphs in different sizes. For a given typeface or font, each character typically corresponds to a single glyph. However, this is not always the case, especially in a font used for a language with a large alphabet or complex writing system, where one character may correspond to several glyphs, or several characters to one glyph.

Watermarking is a technique which allows an individual to add hidden copyright notices or other verification messages to digital audio, video, or image signals and documents. The hidden message is typically a group of bits describing information pertaining to the signal or to the author of the signal (name, place, etc.). The technique takes its name from watermarking of paper or money as a security measure. Digital watermarking is not a form of steganography, in which data is hidden in the message without the end user's knowledge, although some watermarking techniques have the steganographic feature of not being perceivable by the human eye.

SUMMARY

Conventional mechanisms for protecting documents such as those explained above suffer from a variety of deficiencies. One such deficiency is that in a process where a security protected document is printed, then scanned back into a file, any protection originally assigned to the document may be lost.

Embodiments of the invention significantly overcome such deficiencies and provide mechanisms and techniques that provide persistent protection for a document.

In a particular embodiment, a method of providing protection for a document includes obtaining content of the document. An occurrence of a security code within the document content is detected, the security code associated with the document content. A security policy associated with the security code is identified. The identified security policy is then applied to the document content. The document content, with the appropriate security policy included, is then provided to a user.

Other embodiments include a computer readable medium having computer readable code thereon for providing protection for a document. The medium includes instructions for obtaining document content of the document and instructions for detecting an occurrence of a security code within the document content, the security code associated with the document content. The medium further includes instructions for identifying a security policy associated with the security code, instructions for applying the security policy to the document content, and instructions providing the document content, with the appropriate security policy included, to a user.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides persistent protection for a document as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing persistent protection for a document as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Adobe Systems Incorporated of San Jose, Calif.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 1 illustrates a particular embodiment of a document having a security code included therewith;

DETAILED DESCRIPTION

Figure 2:
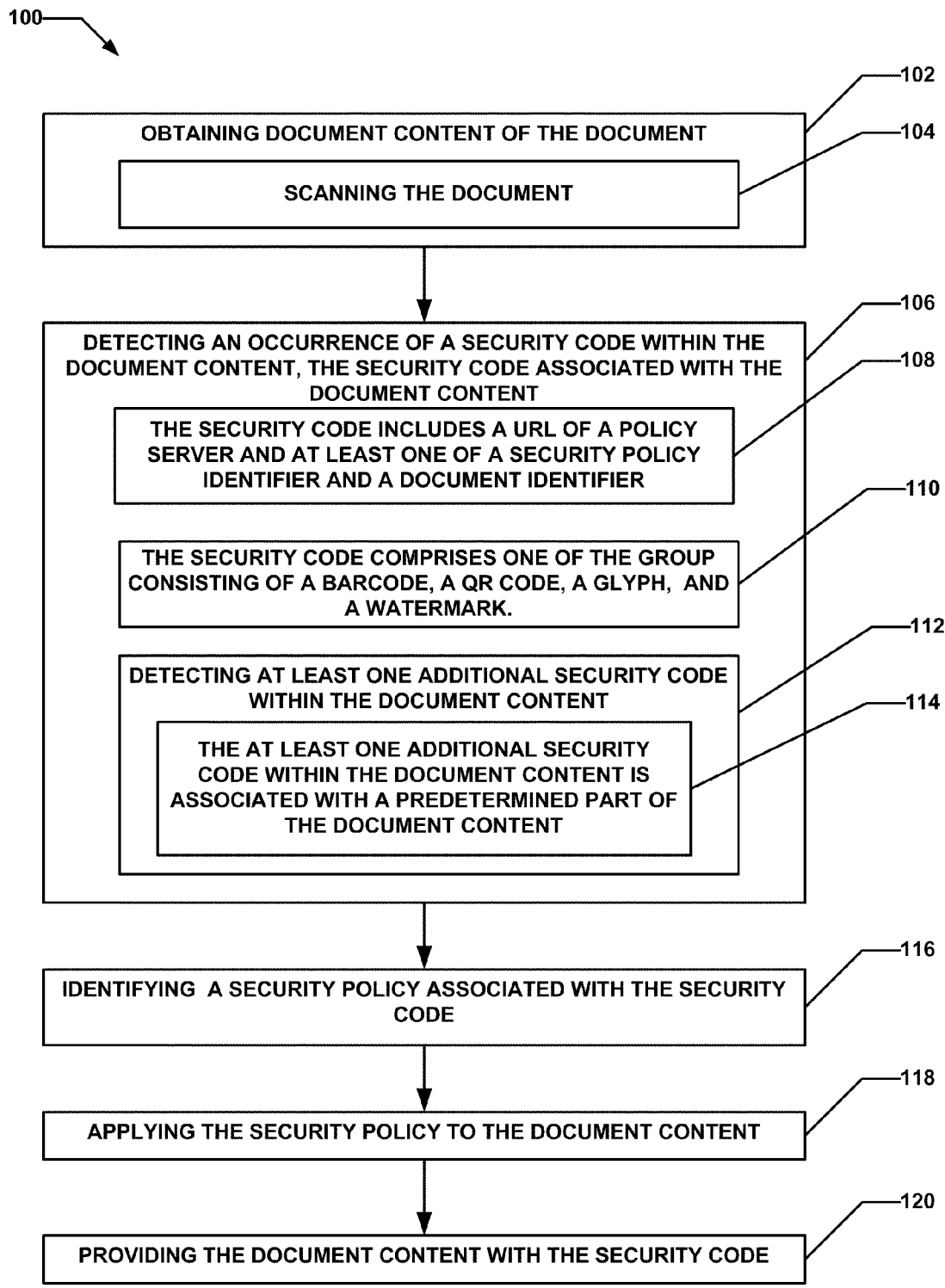
FIG. 2 illustrates a particular embodiment of a method of providing protection for a document in accordance with embodiments of the invention.

In certain scenarios, it is important to provide persistent protection of a document. For example, in consumer-oriented forms workflows, where a form is sent to the customer to be filled out, printed, signed, and returned, the form can be protected when it is sent, but when it is printed, the protection may be lost. It is often the case that the most important time to apply the protection is after the form has been completed.

A method, apparatus and computer program product providing end to end protection for a document is presented. By way of the present invention, protection can be applied to paper documents when they are scanned into a file. Further, it can be ensured that if a paper document started out as a certain file, that the resulting scanned file has the same persistent protection as the file from which it all started.

The method, apparatus and computer program product providing end to end protection for a document uses a code (e.g., a barcode, glyph, watermark or the like) to record the information about policy server protection of a file (e.g. a .pdf (Portable Document Format) file), and then uses the coded information to apply the appropriate policy when a document is scanned back into a file (e.g., another .pdf file).

By encoding the policy information in the printed document (through the code), and reading it as part of the scanning process, it can be ensured that the end-to-end protection of the file is accomplished.

When printing a protected document, the coded information about the policy being used for the document is printed in a predetermined place or region in the document. For example, in one embodiment the coded information is placed near a corner of the document.

The coded information may include a Globally Unique Identifier or GUID, which is a pseudo-random number used in software applications. While each generated GUID is not guaranteed to be unique, the total number of unique keys ($2^{128}$ or $3.4028 \times 10^{38}$) is so large that the possibility of the same number being generated twice is very small. In one embodiment the coded information includes the GUID of the policy, the GUID of the document, and the universal resource locator (URL) of the Policy Server.

The scanner, when reading paper documents to be scanned into a file, checks for the existence of this coded data. If the data exists, the scanner applies the policy to the scanned document content as part of the document generation process.

Referring now to FIG. 1, a particular embodiment of a document 10 in which it is desired to provide persistent security is shown. The document 10 includes text 12 and a security code 14. In this example the security code 14 is realized as a QR Code. While only a single page and a single code are shown, it should be appreciated that multiple pages and multiple codes may be used. Further, while a QR code is shown, other types of codes (e.g., barcodes, glyphs, watermarks or the like) may also be used. The code contains information relating to the document and to the security policy applied to the document.

In a particular example, the document is a .pdf document that may be printed, signed, scanned into a .pdf file and sent back out. While there may be a security policy on the original .pdf file, once the file is printed out, the security policy information for that document would be lost. By way of the security code, the security policy information is maintained with the document. When the document is signed and then scanned back into a .pdf file, the scanner recognizes the occurrence of the security code, reads the security code, and applies the proper security policy for the document to the newly scanned in document, thereby maintaining a persistent security policy with the resulting document, such that the resulting document has the same security protection as the original document.

In one embodiment, the security code may refer to one of three different security code polices (e.g., high, medium, or low). When the document is scanned, the scanner recognizes the code and creates the scanned file as a .pdf file having the proper security assigned thereto. In another example, the security code contains a GUID of a security policy and a URL of the policy server. The scanning process includes going to the URL, obtaining the proper security policy for the document and appling the security policy for the document to the resulting document. In such a manner persistent protection of the documents is maintained even though the document may be printed, modified and scanned into a new document, as the new document is provided having the same security policy as the original document.

A flow chart of the presently disclosed method is depicted in FIG. 2. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 2, a particular embodiment of a method 100 of providing protection for a document is shown. The method begins with processing block 102 which discloses obtaining document content of the document. As stated in processing block 104, this may be accomplished, for example, by scanning the document. While scanning the document is one way to obtain document content, other ways may also be used, such as receiving a coded version of a document, taking a digital photograph, or the like.

Processing block 106 recites detecting an occurrence of a security code within the document content, the security code associated with the document content. As disclosed in processing block 108, the security code may include a URL of a policy server and at least one of a security policy identifier and a document identifier. Processing block 110 states the security code comprises one of the group consisting of a barcode, a QR code, a glyph, and a watermark. Processing block 112 recites detecting at least one additional security code within the document content, which may occur in certain embodiments. When an additional security code is detected, as disclosed by processing block 114, the additional security code is associated with a predetermined part of the document content, such that different security options can be applied to different sections of said document.

Processing block 116 states identifying a security policy associated with the security code. This may include identifying a predefined policy such as low, medium or high or may be a security policy located on a policy server. Processing block 118 discloses applying the security policy to the document content, and processing block 120 recites, providing the document content with the security code. In this manner the resulting document has the same security policy applied thereto as the original document.

Figure 3:
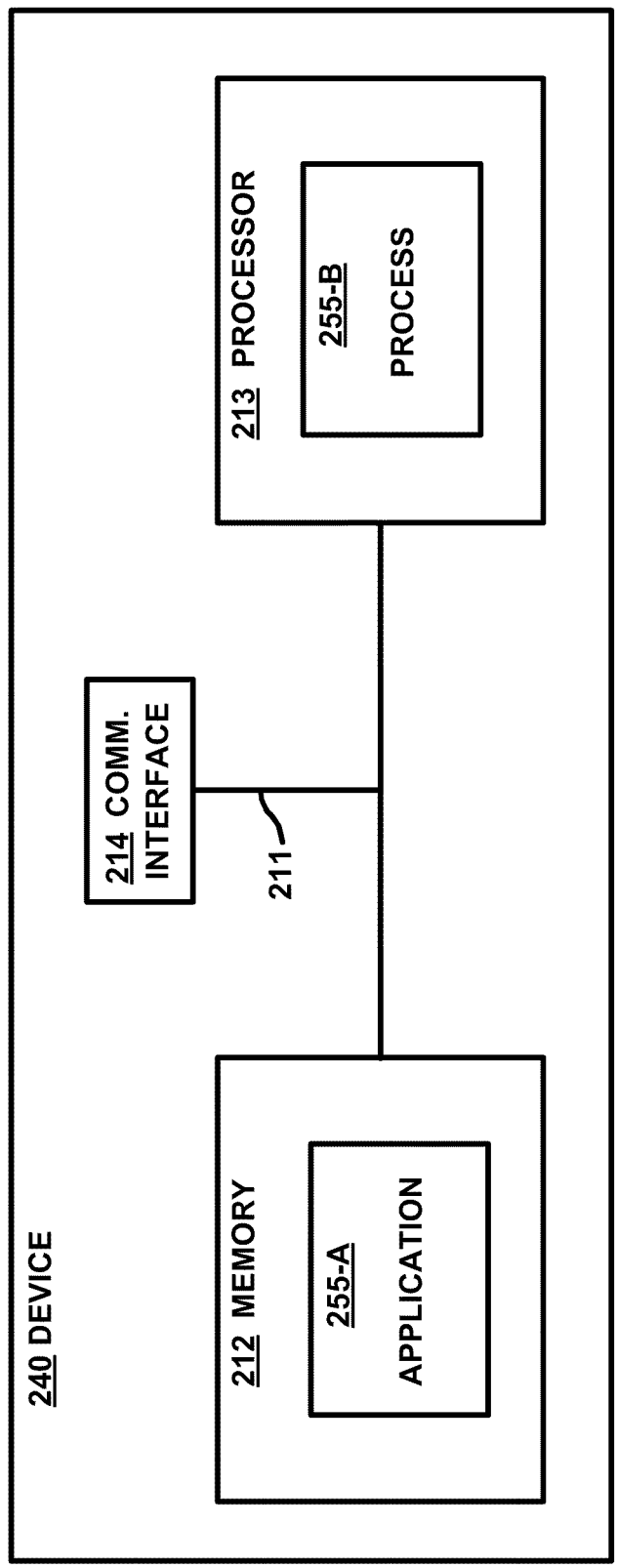
FIG. 3 illustrates an example computer system architecture for a computer system that provides protection for a document in accordance with embodiments of the invention.

FIG. 3 illustrates example architectures of a computer system that is configured as a host computer system 240. The computer system 240 may be any type of computerized system such as a personal computer, workstation, portable computing device, mainframe, server or the like. In this example, the system includes an interconnection mechanism 211 that couples a memory system 212, a processor 213, and a communications interface 214. The communications interface 214 allows the computer system 240 to communicate with external devices or systems.

The memory system 212 may be any type of computer readable medium that is encoded with an application 255-A that represents software code such as data and/or logic instructions (e.g., stored in the memory or on another computer readable medium such as a disk) that embody the processing functionality of embodiments of the invention for the agent 255 as explained above. The processor 213 can access the memory system 212 via the interconnection mechanism 211 in order to launch, run, execute, interpret or otherwise perform the logic instructions of the applications 255-A for the host in order to produce a corresponding process 255-B. In other words, the process 255-B represents one or more portions of the application 255-A performing within or upon the processor 213 in the computer system.

It is to be understood that embodiments of the invention include the applications (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system 212 (e.g., within random access memory or RAM). It is also to be understood that other embodiments of the invention can provide the applications operating within the processor 213 as the processes. While not shown in this example, those skilled in the art will understand that the computer system may include other processes and/or software and hardware components, such as an operating system, which have been left out of this illustration for ease of description of the invention.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method performed by a computerized device comprising:
   obtaining, by the computerized device, document content of a document;
   decoding, by the computerized device, an occurrence of a security code embedded within said document content, said security code identifying a security policy and a policy server, wherein said security code comprises one of the group consisting of a barcode, a QR code, a glyph, and a watermark;
   accessing, by the computerized device, said policy server using said security code identifying said policy server to access said security policy; and
   applying, by the computerized device, said security policy to said document content.

2. The method performed by a computerized device of claim 1 wherein said security code identifies said policy server by a universal resource locator (URL) of said policy server.

3. The method performed by a computerized device of claim 1 further comprising providing said document content with said security code.

4. The method performed by a computerized device of claim 1 wherein said obtaining document content comprises scanning said document.

5. The computer-implemented method of claim 1, further comprising:
   wherein obtaining document content of the document includes obtaining the document content from an optical scanner, the document being a paper document containing printed content and manually written content;
   wherein decoding the occurrence of the security code within the document content comprises decoding a two-dimensional bar code printed on the paper document and obtained with the document content, the two-dimensional bar code being encoded with the security code, the security code including (1) a Uniform Resource Locator (URL) of said policy server that administers the security policy, (2) at least one security policy identifier, and (3) at least one document identifier.

6. The computer-implemented method of claim 1, further comprising:
   decoding at least one additional security code within the document content, the at least one additional security code being associated with a predetermined part of the document content such that a second security policy is applied to the predetermined part of the document content while the security policy is applied to other parts of the document content, the second security policy being different from the security policy.

7. The computer-implemented method of claim 1, wherein applying the security policy to the document content includes applying the security code to a Portable Document Format (PDF) file, generated to store the document content obtained from the optical scanner, before enabling user access to the PDF file.

8. The computer-implemented method of claim 7, wherein the security policy includes limiting printing, text selection, and modification of the PDF file.

9. A method performed by a computerized device comprising:
   obtaining, by the computerized device, document content of a document;
   decoding, by the computerized device, occurrences of a plurality of security codes within said document content, at least one of said plurality of security codes identifying a policy server, wherein said security codes each comprise one of the group consisting of a barcode, a QR code, a glyph, and a watermark, wherein one or more of said plurality of security codes is associated with a predetermined part of said document content, such that different security options apply to different sections of said document;
   accessing, by the computerized device, said policy server using said at least one of said security codes identifying said policy server to access said different security options; and
   applying, by the computerized device, said different security options to said different sections.

10. A non-transitory computer readable medium having computer readable code thereon, the medium comprising:

instructions that upon execution by a computerized device obtain document content of a document;

instructions that upon execution by the computerized device decode an occurrence of a security code embedded within said document content, said security code identifying a security policy and a policy server, wherein said security code comprises one of the group consisting of a barcode, a QR code, a glyph, and a watermark;

instructions that upon execution by the computerized device access said policy server using said security code identifying said policy server to access said security policy; and instructions that upon execution by the computerized device apply said security policy to said document content.

11. The non-transitory computer readable medium of claim 10, further comprising:

wherein said instructions that upon execution by the computerized device decode an occurrence of the security code comprise instructions for decoding a universal resource locator (URL) of said policy server.

12. The non-transitory computer readable medium of claim 10 further comprising:

instructions that upon execution by the computerized device provide said document content with said security code; and wherein said instructions that upon execution by the computerized device obtain document content comprises instructions that upon execution by the computerized device scan said document.

13. The non-transitory computer readable medium of claim 10, further comprising:

wherein said instructions that upon execution by the computerized device detect an occurrence of a security code further comprises instructions that upon execution by the computerized device detect at least one additional security code within said document content; and wherein said instructions that upon execution by the computerized device detect at least one additional security code within said document content further comprises instructions that upon execution by the computerized device associate said at least one additional security code with a predetermined part of said document content, such that different security options can be applied to different sections of said document.

14. A system comprising:

a memory;

a processor;

a communications interface;

an interconnection mechanism coupling the memory, the processor and the communications interface; and wherein the memory is encoded with a document protection application that when performed on the processor, provides a process for processing information, the process causing the computer system to perform the operations of:

obtaining document content of a document;

decoding an occurrence of a security code embedded within said document content, said security code identifying a security policy and a policy server, wherein said security code comprises one of the group consisting of a barcode, a QR code, a glyph, and a watermark;

accessing said policy server using said security code identifying said policy server to access said security policy; and applying said security policy to said document content.

15. The system of claim 14 wherein said security code identifies said policy server by a universal resource locator (URL) of said policy server.

16. The system of claim 14 further comprising:

providing said document content with said security code; and wherein said obtaining document content comprises scanning said document.

17. The system of claim 14, further comprising;

a scanner coupled to the communications interface;

decoding at least one additional security code within said document content; and associating said at least one additional security code with a predetermined part of said document content, such that different security options can be applied to different sections of said document.

* * * * *